(12) United States Patent
Fan et al.

(10) Patent No.: US 8,276,125 B2
(45) Date of Patent: Sep. 25, 2012

(54) AUTOMATIC DISCOVERY OF THE JAVA CLASSLOADER DELEGATION HIERARCHY

(75) Inventors: Nan Fan, Beijing (CN); Allan Bradley Winslow, Manhattan Beach, CA (US); Ting Bin Wu, Beijing (CN); Jean Xu Yu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1271 days.

(21) Appl. No.: 11/950,062

(22) Filed: Dec. 4, 2007

(65) Prior Publication Data

US 2009/0144751 A1    Jun. 4, 2009

(51) Int. Cl.
G06F 9/44    (2006.01)
G06F 9/45    (2006.01)

(52) U.S. Cl. ........ 717/130; 717/118; 717/133; 717/154; 717/165

(58) Field of Classification Search .......... None
See application file for complete search history.

(56) References Cited

U.S. PATENT DOCUMENTS

| | | | |
|---|---|---|---|
| 6,915,511 B2 | 7/2005 | Susaria et al. | |
| 6,944,846 B2 * | 9/2005 | Ryzhov | 717/116 |
| 6,985,909 B2 * | 1/2006 | Blohm | 1/1 |
| 6,996,707 B2 * | 2/2006 | Liang et al. | 713/2 |
| 7,039,923 B2 | 5/2006 | Kumar et al. | |
| 7,107,592 B2 | 9/2006 | Taylor et al. | |
| 7,434,215 B2 | 10/2008 | Boykin et al. | |
| 7,536,412 B2 * | 5/2009 | Blohm | 1/1 |
| 7,644,403 B2 * | 1/2010 | Atsatt | 717/166 |
| 7,721,277 B1 * | 5/2010 | Thyagarajan et al. | 717/166 |
| 7,818,721 B2 | 10/2010 | Sundararajan et al. | |
| 7,827,566 B2 | 11/2010 | Svetoslavov et al. | |
| 7,840,967 B1 * | 11/2010 | Czajkowski et al. | 719/312 |
| 7,870,546 B2 | 1/2011 | Meduri et al. | |
| 2004/0015936 A1 * | 1/2004 | Susarla et al. | 717/166 |
| 2004/0019596 A1 * | 1/2004 | Taylor et al. | 707/100 |
| 2004/0019887 A1 * | 1/2004 | Taylor et al. | 717/166 |
| 2004/0153996 A1 * | 8/2004 | Boykin et al. | 717/118 |
| 2005/0060698 A1 * | 3/2005 | Boykin et al. | 717/166 |
| 2005/0267962 A1 * | 12/2005 | Svetoslavov et al. | 709/223 |
| 2006/0080280 A1 * | 4/2006 | Blohm | 707/1 |
| 2006/0130034 A1 | 6/2006 | Beisiegel et al. | |
| 2007/0180439 A1 | 8/2007 | Sundararajan et al. | |
| 2007/0198475 A1 * | 8/2007 | Meduri et al. | 707/3 |
| 2008/0155555 A1 * | 6/2008 | Kwong | 719/315 |
| 2009/0144714 A1 | 6/2009 | Bangma et al. | |
| 2009/0144751 A1 | 6/2009 | Fan et al. | |

OTHER PUBLICATIONS

Office Action regarding U.S. Appl. No. 11/950,083, dated Feb. 27, 2012, 19 pages.

(Continued)

*Primary Examiner* — Isaac Tecklu
(74) *Attorney, Agent, or Firm* — Yee & Associates, P.C.; Jeffrey S. LaBaw (57) ABSTRACT

A computer implemented method, data processing system, and computer program product for automatic discovery of the Java classloader delegation hierarchy. One or more classloaders are instrumented with byte code instrumentation code such that a delegation event is received each time a classloader delegates a resource finding method to a parent classloader of the classloader. From each delegation event received, the classloader that generated the delegation event and a parent classloader to which the classloader directly delegates the resource finding method is determined. Based on the delegation events received, the classloaders to which a current classloader in the one or more classloaders can directly delegate are determined. The order of delegation to the classloaders may then be determined.

20 Claims, 7 Drawing Sheets

OTHER PUBLICATIONS

"JVM Tool Interface, Version 1.0", http://download.oracle.com/javase/1.5.0/docs/guide/jvmti/jvmti.html, accessed Nov. 8, 2011, 198 pages.

Coha et al., "JavaOne 2004—Bytecode Instrumentation—Making it Simple—Session 3042", 2004 JavaOne Conference, Session 3042, 2004, pp. 1-77.

"AspectJ", http://en.wikipedia.org/wiki/AspectJ, accessed Sep. 16, 2011, 4 pages.

"aspectj crosscutting objects for better modularity", http://www.eclipse.org/aspectj, accessed Sep. 16, 2011, 5 pages.

"An Introduction to Java Class Loaders", http://www.indicthreads.com/2233/an-introduction-tojava-class-loaders, accessed Nov. 8, 2011, 4 pages.

"Java 2 SDK, Standard Edition Documentation, Version 1.4.2", http://download.oracle.com/javase/1.4.2/docs, accessed Nov. 8, 2011, 4 pages.

"Understanding the Java ClassLoader", http://www.ibm.com/developerworks/java/tutorials/j-classloader, accessed Sep. 16, 2011, 3 pages.

USPTO Office Action regarding U.S. Appl. No. 11/950,083, dated Aug. 8, 2011.

* cited by examiner

AUTOMATIC DISCOVERY OF THE JAVA CLASSLOADER DELEGATION HIERARCHY

BACKGROUND OF THE INVENTION

1. Field of the Invention

The present invention relates generally to byte code instrumentation (BCI) in a data processing system, and in particular to a computer implemented method, data processing system, and computer program product for automatic discovery of the Java classloader delegation hierarchy.

2. Description of the Related Art

Java is an object-oriented programming language and environment focusing on defining data as objects and the methods that may be applied to those objects. Java is designed to solve a number of problems in modern programming practice. Java is able to support applications for many types of data processing systems, which may contain a variety of central processing units and operating system architectures. To enable a Java application to execute on different types of data processing systems, a compiler typically generates an architecture-neutral file format, so that the compiled code is executable on many processors, given the presence of the Java runtime system. The Java compiler generates byte code instructions that are non-specific to any particular computer architecture. A byte code is a machine independent code generated by the Java compiler and executed by a Java interpreter. A Java interpreter is a module that alternately decodes and executes a byte code. The decoding of the byte code places the instruction into an executable form for the computer on which the code is to be executed. Then, the instruction is executed by the computer. These byte code instructions are designed to be easy to interpret on any machine and easily translated on the fly into native machine code.

The Java Virtual Machine (JVM) is a virtual computer component. A virtual computer component is an abstract computer component that only resides in memory. A JVM includes components necessary to run a program on a computer, including an interpreter. The JVM allows Java programs to be executed on different platforms as opposed to only a single platform. Typically, computer programs are originally written in a human-readable format called source code, which is then compiled (by a computer program called a "compiler") into a format that can be directly implemented by a computer system. Conventionally, programs must be compiled for one specific platform (i.e., processing unit and operating system combination) such that a program that has been compiled for one platform will often not run on a different platform. Java programs are compiled for the JVM rather than for any particular platform (although there are typically different versions of the JVM adapted to different platforms). In this manner, Java is able to support applications for many types of data processing systems, which may contain a variety of central processing units and operating system architectures.

There are a number of approaches to dynamically loading interdependent components of executable code (such as plug-ins, bundles, etc.) in modern programming languages. Dynamically loading means to load one or more components of an application after the application has begun execution. In the Java programming language, classes are dynamically loaded using a classloader as an application program executes.

The classloader is responsible for searching for a particular class, and making that class available to the run-time system if found. In object-oriented programming, a class consists of a collection of types of encapsulated instance variables and types of methods, possibly with implementation of those types, together with a constructor function that can be used to create objects of the class. Java class loading is based on a delegation model, wherein a classloader first delegates the class loading responsibility to its immediate parent classloader.

Byte Code Instrumentation (BCI) is a widely adopted technique used to alter Java virtual machine byte code instructions. Byte code instrumentation typically introduces additional Java classes into the byte code instructions to profile Java applications. For load-time and dynamic byte code instrumentation, deployment of the newly added classes in the byte code instructions is a time consuming and non-trivial process. However, this deployment is the key to successful loading/execution of the altered byte code. Although some application vendors provide dedicated locations for inserting BCI code, there is currently no mechanism in the existing art which enables the added Java classes (BCI code) to be deployed automatically.

With the existing manual methods for BCI code deployment, there are several drawbacks. One drawback is that the Java class deployment is a static process. Whenever there is a change in the product being instrumented, there is a possibility that the BCI code will not work in the new environment. BCI code deployment locations are also limited to the configurations supported by a product. In some circumstances, even if a deployment location is identified, deployment to that location is not possible. In addition, discovering the correct classloader to use to load the new classes can be a protracted process. Without a standard and systematic method for discovering the correct classloader to use, programmers can only rely on product documentation, product implementation details (if available), and experimenting with multiple possibilities by actually loading the BCI code.

SUMMARY OF THE INVENTION

The illustrative embodiments provide a computer implemented method, data processing system, and computer program product for automatic discovery of the Java classloader delegation hierarchy. One or more classloaders are instrumented with byte code instrumentation code such that a delegation event is received each time a classloader delegates a resource finding method to a parent classloader of the classloader. From each delegation event received, the classloader that generated the delegation event and a parent classloader to which the classloader directly delegates the resource finding method is determined. Based on the delegation events received, the classloaders to which a current classloader in the one or more classloaders can directly delegate are determined. The order of delegation to the classloaders may then be determined.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
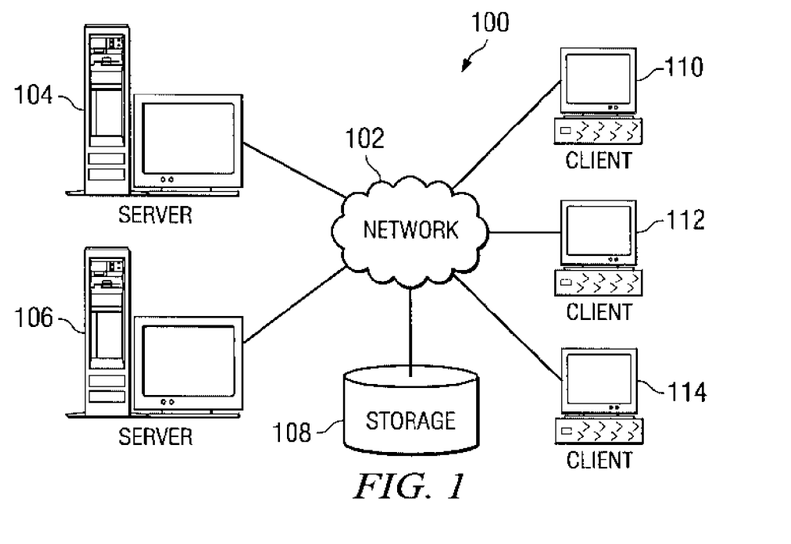
FIG. 1 depicts a pictorial representation of a distributed data processing system in which the illustrative embodiments may be implemented.
Figure 2:
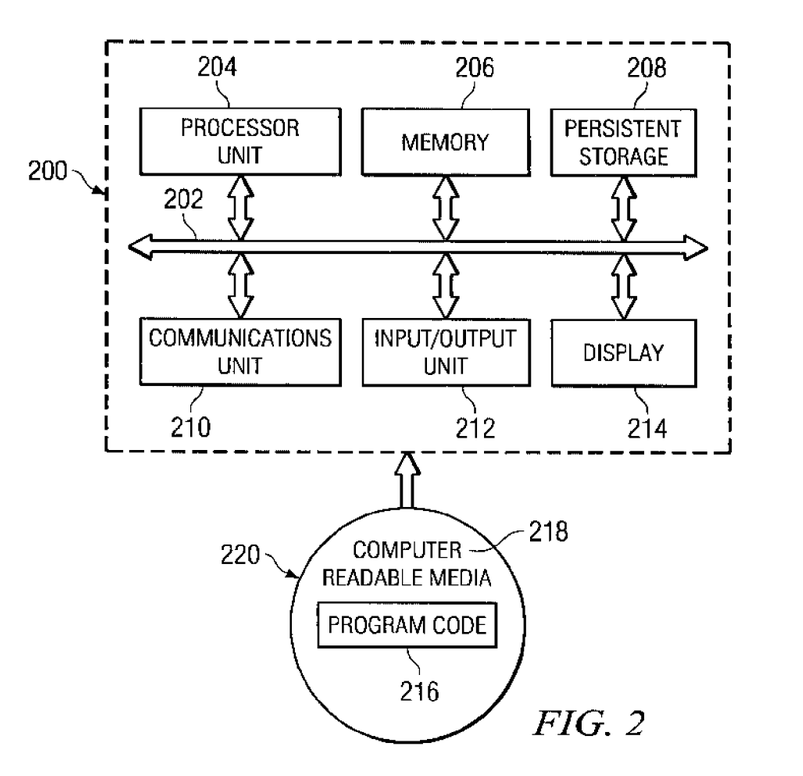
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media x18 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments provide a mechanism for automatically discovering the classloader delegation hierarchy of a JVM using BCI technology to instrument the classloaders in the JVM. The Java language has traditionally supported classloader objects that are responsible for loading classes. The classloaders are usually organized in a hierarchical tree structure, i.e., in a parent-child relationship. The classloaders use a delegation mechanism to find and load classes and resources across the hierarchy. Most commonly, the delegation pattern is a parent-first delegation pattern which requires a child classloader to delegate a request to load a class to its parent before looking for the requested class within its own scope.

The delegation hierarchy of a classloader in a JVM can be automatically discovered according to the illustrative embodiments by calculating the properties of each and every node (classloader) in the classloader's delegation hierarchy using BCI technology. Each classloader has two properties: the first property comprises a list of all possible classloaders to which the current classloader can directly delegate; and the second property comprises the delegation order of the classloaders in the list. Once these two properties have been calculated for a classloader, the delegation hierarchy of the classloader is known.

The illustrative embodiments also provide a mechanism for automatically deploying BCI code at class load time. The mechanism comprises a class automatic deployment solution which uses BCI technology to instrument the classloaders in the JVM. The class automatic deployment solution also adds another extended classpath to the classloaders using BCI technology to enable the classloaders to change paths dynamically. The classloaders are instrumented using BCI technology to generate a class loading event (notification) to a monitoring class when a class is loaded. When the monitoring class receives the notification, the monitoring class determines if new BCI code needs to be loaded with the loaded class. If so, the monitoring class initiates auto deployment code to determine the correct classloader to load the new BCI code. In environments where a class loader is used to load a class (i.e., Java), an application must determine which classloader to use to initiate the loading of classes. To determine the correct classloader to use, the auto deployment code uses the previously mentioned classloader delegation hierarchy of each classloader in the JVM to determine which classloaders in each delegation hierarchy are dependent on the new BCI code, and then calculates the correct classloader in the JVM to use to load the new BCI code. The auto deployment code then dynamically inserts the new BCI code into the added extended classpath of the correct classloader, thereby providing on-demand deployment of the new BCI code.

As the dynamic deployment in the illustrative embodiments is based on BCI technology, as long as a correct classloader (deployment location) is identified by the auto deployment code, the actual deployment is not limited to the particular configuration supported by the specific vendor product in use. Thus, the BCI code deployment in the illustrative embodiments is ensured to work with the current deployment configuration supported by the product in use. In addition, the discovery of the correct classloader according to the illustrative embodiments is a programmatic process, rather than a manual process.

Figure 3:
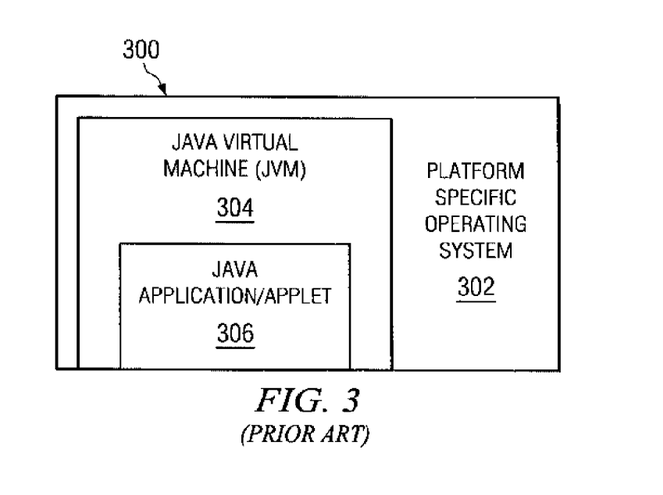
FIG. 3 is a block diagram that illustrates the relationship of software components operating within a computer system that may implement the illustrative embodiments.

With reference now to FIG. 3, a block diagram that illustrates the relationship of software components operating within a computer system that may implement the illustrative embodiments is depicted. Java-based system 300 contains platform specific operating system 302 that provides hardware and system support to software executing on a specific hardware platform. Java Virtual Machine (JVM) 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 described above with reference to FIG. 2. However, JVM 304 may be implemented in dedicated hardware on a so-called Java chip, Java-on-silicon, or Java processor with an embedded picoJava core.

At the center of a Java run-time environment is the JVM, which supports all aspects of the Java environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAS.

A JVM loads class files and executes the bytecodes within them. The class files are loaded by a classloader in the JVM. The classloader loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 4:
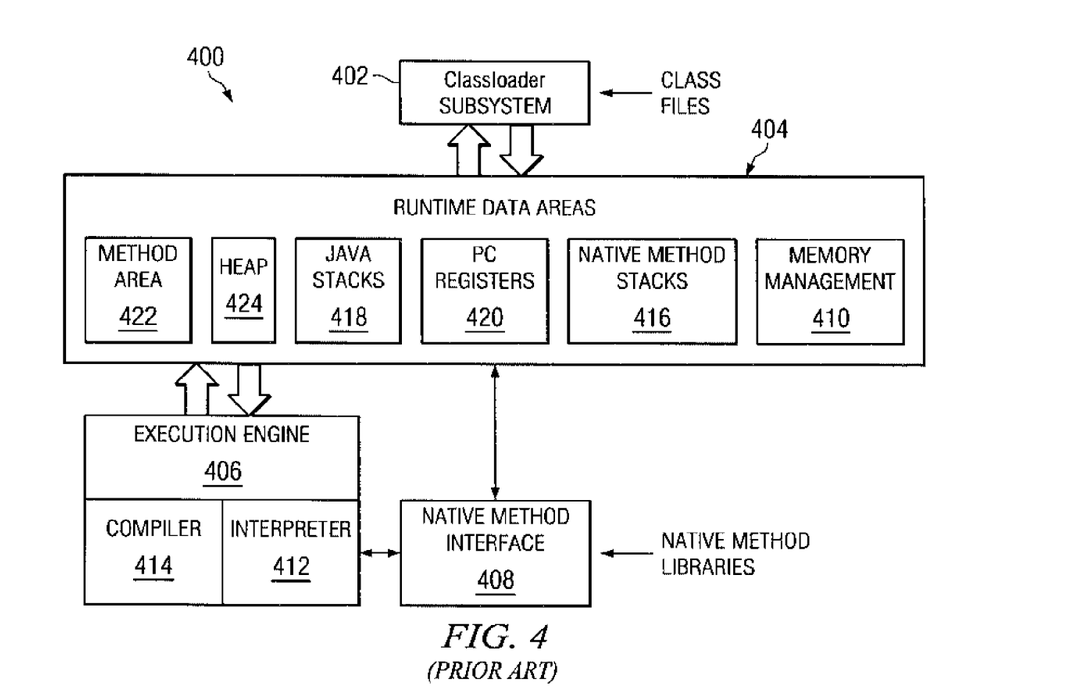
FIG. 4 is a block diagram that depicts a Java Virtual Machine in accordance with the illustrative embodiments.

With reference now to FIG. 4, a block diagram of a JVM is depicted in accordance with the illustrative embodiments. JVM 400 includes classloader subsystem 402, which is a mechanism for loading types, such as classes and interfaces, given fully qualified names. JVM 400 also contains runtime data areas 404, execution engine 406, native method interface 408, and memory management 410. Execution engine 406 is a mechanism for executing instructions contained in the methods of classes loaded by class loader subsystem 402. Execution engine 406 may be, for example, Java interpreter 412 or just-in-time compiler 414. Native method interface 408 allows access to resources in the underlying operating system. Native method interface 408 may be, for example, the Java Native Interface (JNI).

Runtime data areas 404 contain native method stacks 416, Java stacks 418, PC registers 420, method area 422, and heap 424. These different data areas represent the organization of memory needed by JVM 400 to execute a program.

Java stacks 418 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks 418 are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

Program counter (PC) registers 420 are used to indicate the next instruction to be executed. Each instantiated thread gets its own PC register and Java stack. If the thread is executing a JVM method, the value of the PC register indicates the next instruction to execute. If the thread is executing a native method, then the contents of the PC register are undefined. Native method stacks 416 store the state of invocations of native methods. The state of native method invocations is stored in an implementation-dependent way in native method stacks, registers, or other implementation-dependent memory areas. In some JVM implementations, native method stacks 416 and Java stacks 418 are combined.

Method area 422 contains class data while heap 424 contains all instantiated objects. The constant pool is located in method area 422 in these examples. The JVM specification strictly defines data types and operations. Most JVMs choose to have one method area and one heap, each of which are shared by all threads running inside the JVM, such as JVM 400. When JVM 400 loads a class file, it parses information about a type from the binary data contained in the class file. JVM 400 places this type of information into the method area 422. Each time a class instance or array is created, the memory for the new object is allocated from heap 424. JVM 400 includes an instruction that allocates memory space within the memory for heap 424 but includes no instruction for freeing that space within the memory. Memory management 410 in the depicted example manages memory space within the memory allocated to heap 424. Memory management 410 may include a garbage collector, which automatically reclaims memory used by objects that are no longer referenced. Additionally, a garbage collector also may move objects to reduce heap fragmentation.

Figure 5:
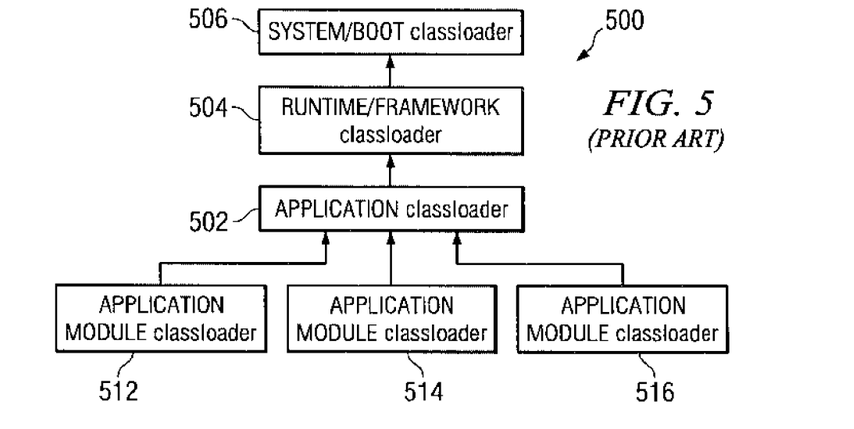
FIG. 5 is a block diagram that schematically illustrates a classloader architecture in the Java framework to assist in explaining aspects of the illustrative embodiments.

FIG. 5 is a block diagram that schematically illustrates a classloader architecture in the traditional Java framework to assist in explaining aspects of the illustrative embodiments. The classloader architecture is generally designated by reference number 500, and may be implemented in classloader subsystem 402 in JVM 400 illustrated in FIG. 4.

As shown in FIG. 5, classloader architecture 500 comprises a hierarchical tree architecture in which classloaders are organized in a parent-child relationship. In the exemplary embodiment illustrated in FIG. 5, hierarchical architecture 500 includes classloaders 502, 504 and 506. Classloaders 502-506 include, in order from the bottom to the top of hierarchical tree 500: Application Classloader 502, Runtime/Framework Classloader 504 and System/Bootstrap Classloader 506. Although only one Application Classloader is shown in FIG. 5, other Application Classloaders can be included in the hierarchy as well. As additionally shown in FIG. 5, a plurality of Application Module classloaders, for example, Application Module classloaders 512, 514 and 516 may be included for modules that might be included in an application. It should be understood, however, that the classloaders and their order are intended to be exemplary only as hierarchical architecture 500 can include any number of classloaders arranged in any desired hierarchical manner.

In hierarchical architecture 500, classloader 502 at the bottom of the hierarchical tree is a child of classloader 504. Classloader 504 is both a parent of classloader 502 and a child of classloader 506. Classloader 506 is a parent of classloader 504 and is at the top of the hierarchy.

Classloader architecture 500 typically uses a delegation mechanism to find and load classes and resources across the hierarchy. Usually, the delegation mechanism is a parent-first delegation pattern that requires a child classloader to delegate a request to load a class to its parent classloader before looking for the class within its own scope. Thus, in the hierarchy illustrated in FIG. 5, when a request to load a class is received by Application classloader 502 from an application (or by one of module classloaders 512, 514, 516 from an application module, if present), it will forward the request up the hierarchy to the topmost classloader 506. Each classloader will look for the requested class, and either load the class if it is found, or return the request to its child classloader down to the Application module classloaders. If none of the classloaders are able to return the requested class, an error will be returned.

Figure 6:
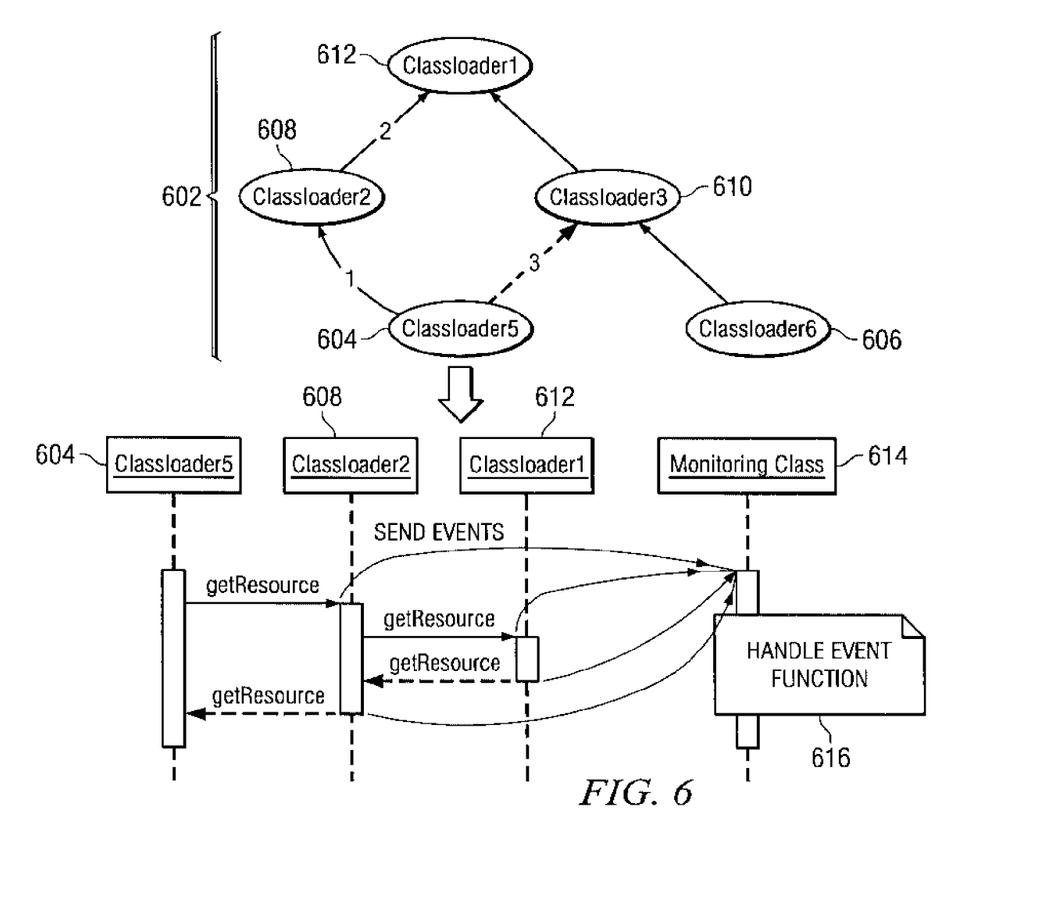
FIG. 6 is a block diagram illustrating how to obtain the properties of a classloader in accordance with the illustrative embodiments.
Figure 7:
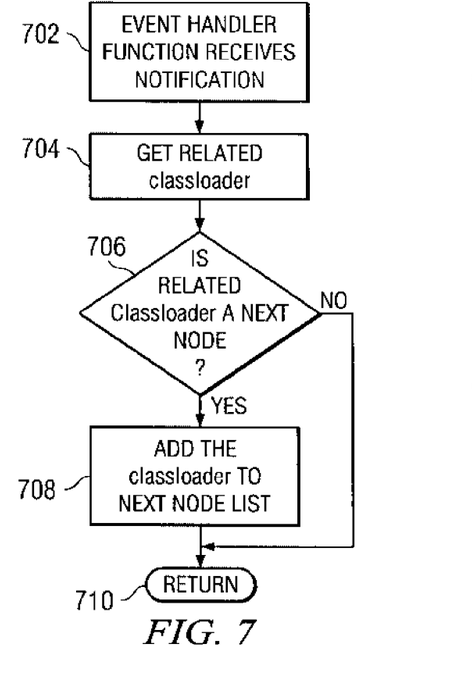
FIG. 7 is a flowchart of a process for calculating the classloader delegation hierarchy in accordance with the illustrative embodiments.

FIGS. 6 and 7 describe the mechanism for automatically discovering the delegation hierarchy of a classloader. The delegation hierarchy discovered using the mechanism described in FIGS. 6 and 7 may be employed by the auto deployment code described later in FIGS. 8-11 to determine the list of classloaders which import BCI code, as well as to determine the correct classloader to use to load the new BCI code. The delegation hierarchy of a classloader in a JVM can be automatically discovered by calculating the properties of each classloader in the classloader's delegation hierarchy. The first property to be calculated for a classloader is the list of all possible classloaders to which the current classloader can directly delegate. The second property to be calculated is the delegation order of the classloaders in the list. The mechanism in the illustrative embodiments may be used in particular for discovering the delegation hierarchy of user-customized classloaders, as the hierarchy of JVM built-in classloaders, including the bootstrap classloader, the Java system classloader, and the Java extended classloader, is definitive.

FIG. 6 is a diagram illustrating how to obtain the properties of a classloader in accordance with the illustrative embodiments. Classloader architecture 602 comprises classloader5 604 and classloader6 606, each of which is shown to be able to delegate to parent classloader2 608 and parent classloader3 610. Classloader2 608 and classloader3 610 are both able to delegate to parent classloader1 612. All of the classloaders are instrumented with BCI code with a resource finding method to collect the classloader's delegation information.

to obtain the list of all possible classloaders to which a classloader, such as classloader5 604, can directly delegate, the illustrative embodiments employ BCI technology to instrument a classloader at runtime with a resource finding method to collect the classloader's delegation information. One resource finding method that may be used for collecting delegation information is the loadClass method. As the current classloader delegates the loadClass method to its parent classloaders, the delegation information of the current classloader may be obtained. However, the loadClass method is a synchronized method. If BCI code invokes the loadClass method to collect the delegation information, the BCI code will lock the current classloader. A deadlock may also occur if another thread attempts to load a class using the current classloader.

Instead of using the resource finding of the loadClass method, the illustrative embodiments employ the standard API of resource finding—classloader.getResource( ) method. The getResource( ) method is used to trace the delegation relationships among the classloader and the classloaders to which the current classloader can directly delegate. A non-existent resource is used as the resource in the getResource( ) method to allow the getResource( ) method to traverse the entire delegation path of the current classloader, as none of the classloaders in the path will be able to locate the resource. The default implementation of the getResource( ) method will first search the parent classloader for the resource. Each classloader.getResource( ) method is instrumented to insert a delegation event generator using BCI technology. The delegation event comprises the classloader instance name and the (non-existent) resource name.

In some situations, however, user defined classloaders may bypass the default implementation above. To address these situations, user defined classloaders need to employ a user defined method to delegate the resource finding instead of getResource( ) method. One way to implement a user defined resource finding method is to instrument the user defined resource finding methods which are under the control flow of the getResource( ) method, wherein the control flow of the getResource( ) method comprises all code which is executed between entering the method and exiting the method (e.g., methodA calls methodB, then the code in methodB is under the control flow of methodA). Another way to implement a user defined resource finding method is to instrument the user defined resource finding methods having a signature of which matches javax.net.URL java.lang.Classloader.*(*), where *(*) is the resource finding method.

As shown, a getResource( ) method to a non-existent resource is initiated on classloader5 604. When the getResource( ) method is invoked on classloader5 604, classloader5 604 delegates the method to its parent classloaders, classloader2 608 and classloader3 610, according to normal delegation procedure. Classloader5 604 also sends a delegation event to monitoring class 614 in the JVM. Although only the getResource( ) path to parent classloader2 608 is depicted in FIG. 6, it should be noted that the getResource( ) method is delegated to all other parent classloaders of classloader5 604, including classloader3 610 in order to determine the complete delegation hierarchy of the current classloader. The path to parent classloader2 608 is merely shown as one example.

When the delegated getResource( ) method is received at the parent classloader (e.g., classloader2 608), classloader2 608 also delegates the method to its parent classloader, classloader1 612, according to normal delegation procedure. Classloader2 608 also sends a delegation event to monitoring class 614.

When the delegated getResource( ) method is received at parent classloader1 612, classloader1 612 sends a delegation event to monitoring class 614. Since classloader1 612 is the root classloader in the hierarchy, classloader1 612 returns the getResource( ) method to classloader2 608 to find the resource, which in turn returns the getResource( ) method to classloader5 604 to find the resource.

Monitoring class 614 comprises an event handling function 616 which receives and processes each event received from the classloaders. Event handling function 616 uses this delegation information in each event to determine the classloaders to which classloader5 604 has delegated the getResource ( ) method. Event handling function 616 also determines the order in which the method was delegated to those classloaders.

FIG. 7 is a flowchart of a process for calculating the classloader delegation hierarchy in accordance with the illustrative embodiments. The process described in FIG. 7 may be implemented by event handling function 616 in monitoring class 614 in FIG. 6. The event handling function is invoked each time a delegation event is received by the monitoring class.

The process begins when the event handling function receives a delegation event notification from the get Resource( ) method of a classloader (step 702). Upon receiving the notification event, the event handling function determines the classloader that sent the delegation event from the classloader instance name in the event and the classloader to which the getResource( ) method was delegated (related classloader)

(step 704). The event handling function then determines if the related classloader is a next node (step 706). A next node is a classloader which is a directly delegated classloader of the classloader which sent the delegation event.

If the related classloader is not a next node ('no' output of step 706), the process continues to step 710. If the related classloader is a next node ('yes' output of step 706), the event handling function adds the related classloader to a next node list (step 708). The next node list comprises the classloaders to which the current classloader can delegate, and the placement of the classloaders in the list indicates the delegation order of the classloaders. At step 710, the event handling function is completed and returns to the monitoring class.

FIGS. 8-11 illustrate the mechanism for Java class automatic deployment using byte code instrumentation technology. The class automatic deployment using the mechanism described in FIGS. 8-11 may employ the class delegation hierarchy mechanism to determine the list of classloaders which import BCI code, as well as to determine the correct classloader to use to load the new BCI code.

Figure 8:
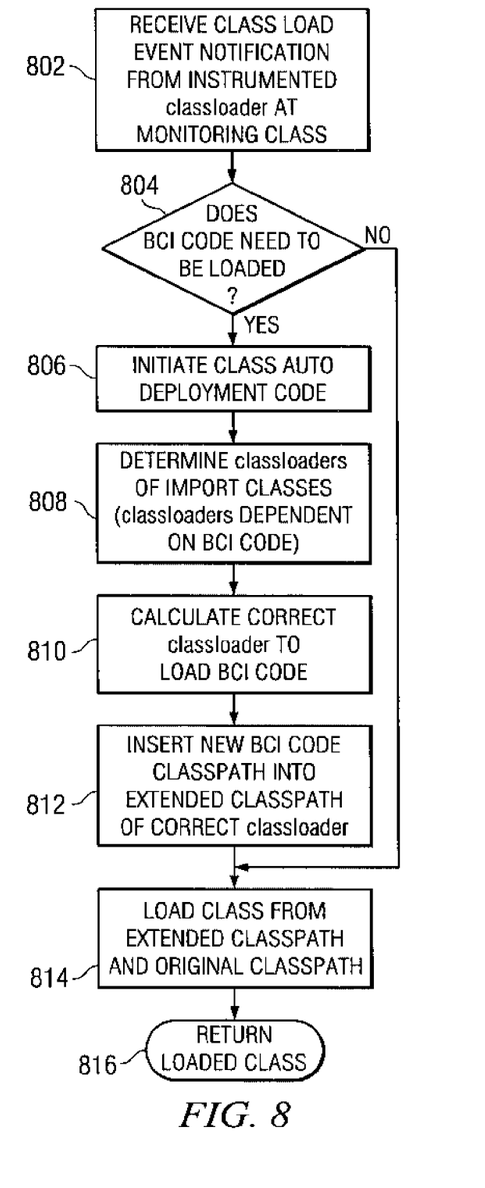
FIG. 8 is a high level flowchart of a process for automatic deployment of BCI code in accordance with the illustrative embodiments.

FIG. 8 depicts a high level flowchart of the process for automatic deployment of new BCI code in accordance with the illustrative embodiments. The process depicted in FIG. 8 may be implemented in a JVM, such as JVM 400 in FIG. 4. Prior to implementing the process in FIG. 8, classloaders in the JVM are instrumented using BCI code to generate a class loading event when a class is loaded. For instance, the loadClass method of each classloader may be instrumented by adding a callback method at the beginning of the loadClass method. When the loadClass method is instrumented in this manner, the callback method will be invoked every time the loadClass method is invoked. The callback method is used to provide a notification of a class load event to a monitoring class in the JVM.

The process begins when a class loading event notification generated by an instrumented classloader is received at the monitoring class in the JVM in response to a class being loaded (step 802). In response, the monitoring class makes a determination as to whether new BCI code needs to be loaded with the loaded class (step 804). This new BCI code comprises byte code instrumentation code which modifies the existing byte code instructions in the loaded class. If the monitoring class determines that no new BCI code needs to be loaded (i.e., no modification of the existing byte code is needed) ('no' output of step 804), the process continues to step 814.

If the monitoring class determines that new BCI code needs to be loaded ('yes' output of step 804), the monitoring class initiates the class auto deployment code (step 806). The class auto deployment code first determines which classloaders in the JVM are dependent on the new BCI to be loaded (step 808). To ensure that BCI code can be initialized successfully, it is required that a classloader of the new BCI code can visit all classes dependent on the new BCI code, or import classes. In other words, the classloaders of the import classes have a delegation relationship with the classloader of the new BCI code. The auto deployment code may use the classloader delegation hierarchy of a classloader to determine those classloaders that load import classes of the new BCI code. This step is described in further detail in FIG. 9.

Next, the auto deployment code calculates the correct classloader in the JVM to use to load the new BCI code (step 810). This calculation of the correct classloader is made based on the classloaders of the imported classes as determined in step 808 and the classloader delegation hierarchies of the classloaders. This step is described in further detail in FIG. 10.

Once the correct classloader is known, the auto deployment code dynamically inserts the new BCI code classpath into an extended classpath of the correct classloader (step 812). This new extended classpath field is inserted into the class declaration using BCI technology to instrument the classloader. This extended classpath field can be changed dynamically. The class is then loaded with new BCI code from the extended classpath and the original classpath (step 814). The auto deployment code then ends (step 816).

Thus, to implement the auto deployment code in the illustrative embodiments, the beginning of the loadClass method of each classloader is instrumented to add a callback method using BCI code to notify the monitoring class when class is loaded, and thus initiate the auto deployment code if new BCI code is needed. Each classloader is also instrumented to insert a new extended classpath field into the class declaration. This new extended classpath field may be dynamically changed by the classloader, which enables new BCI code to be auto deployed as needed.

Figure 9:
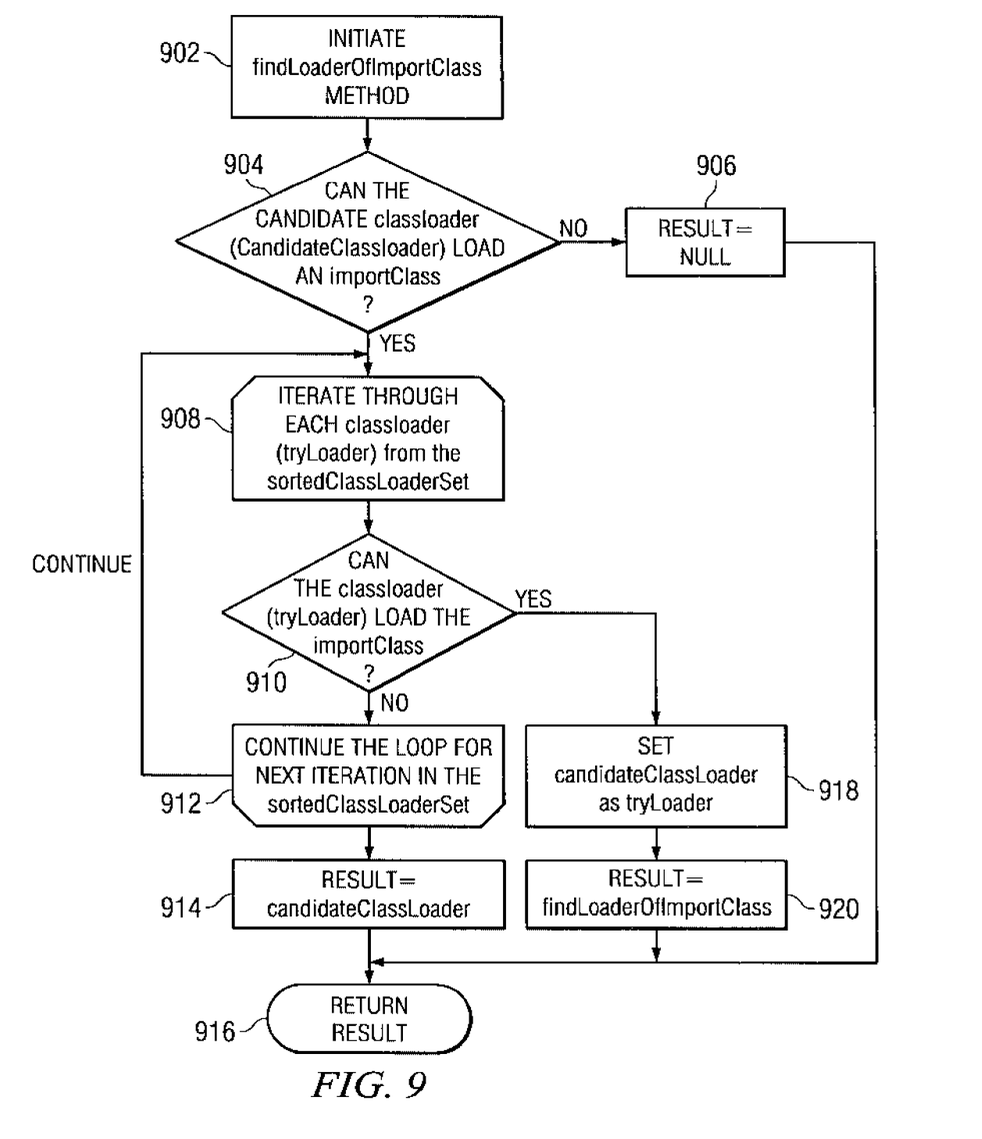
FIG. 9 is a flowchart of a process for determining the classloaders that can load an imported class of BCI code in accordance with the illustrative embodiments.

FIG. 9 is a flowchart of a process for determining the classloaders that load an imported class of BCI code in accordance with the illustrative embodiments. The process described in FIG. 9 is implemented as step 808 in FIG. 8. Each classloader has an associated classloader delegation hierarchy which specifies the parent classloaders to which a classloader can delegate, and the order of the delegation. The classloader delegation hierarchy for each classloader is used to provide a sorted list of directly-delegated classloaders to the process in FIG. 9. Based on the sorted list, the classloaders which load an imported class of BCI code may be determined.

The process begins with the auto deployment code initiating the findLoaderOfImportClass method (step 902). The findLoaderOfImportClass method is used to return the most suitable candidate classloader for loading an import class to the class auto deployment process in step 808 in FIG. 8. As there may be multiple import classes for the needed BCI code, the candidateClassloader of each import class will be determined by invoking the findLoaderOfImportClass method.

A determination is made by the findLoaderOfImportClass method as to whether the current candidate classloader (candidateClassloader) can load an imported class (importClass) (step 904). The importClass is the name of the imported class (BCI code) that the classloader (which needs to be determined) can load. The candidateClassloader is the current classloader loading the importClass. The default value of candidateClassloader is the classloader that attempts to load the new BCI code.

If the candidateClassloader cannot load an imported class ('no' output of step 904), the process generates a result comprising a null value (step 906), with the process continuing to step 916. If the candidateClassloader can load an imported class ('yes' output of step 904), the findLoaderOfImportClass method iterates through each classloader (tryLoader) in the sortedClassloaderSet (step 908). The sortedClassloaderSet is the list of sorted directly-delegated classloaders of the specific candidate classloader, which can be determined using the classloader delegation hierarchy discovery method previously described in FIGS. 6 and 7. The classloaders in the sortedClassloaderSet are iterated through based on sorted priority.

The findLoaderOfImportClass method then determines if a classloader (tryLoader) in the iteration of sortedClassLoaderSet can load importClass (step 910). If the classloader (tryLoader) in the iteration cannot load importClass ('no' output of step 910), the process continues for the next iteration of the sortedClassloaderSet (step 912) and loops back to step 908. However, if there are no more classloaders in the sortedClassloaderSet, the findLoaderOfImportClass method determines the most suitable classloader for loading the import class is the candidate classloader (step 914). The findLoaderofImportClass method then returns the candidate classloader (step 916) to the auto deployment code in step 808 of FIG. 8.

Turning back to step 910, if a classloader (tryLoader) in the iteration can load importClass ('yes' output of step 910), that classloader (tryLoader) in the iteration is determined to be the candidate classloader (i.e., the most suitable classloader for loading the particular import class). Thus, the candidate classloader is set to be the particular tryLoader (step 918). The findLoaderofImportClass method is called again using the current candidate classloader (step 920), since the candidate classloader is changed in step 918.

At step 916, the findLoaderofImportClass method returns the candidateClassLoader to the auto deployment code in step 808 of FIG. 8.

Figure 10:
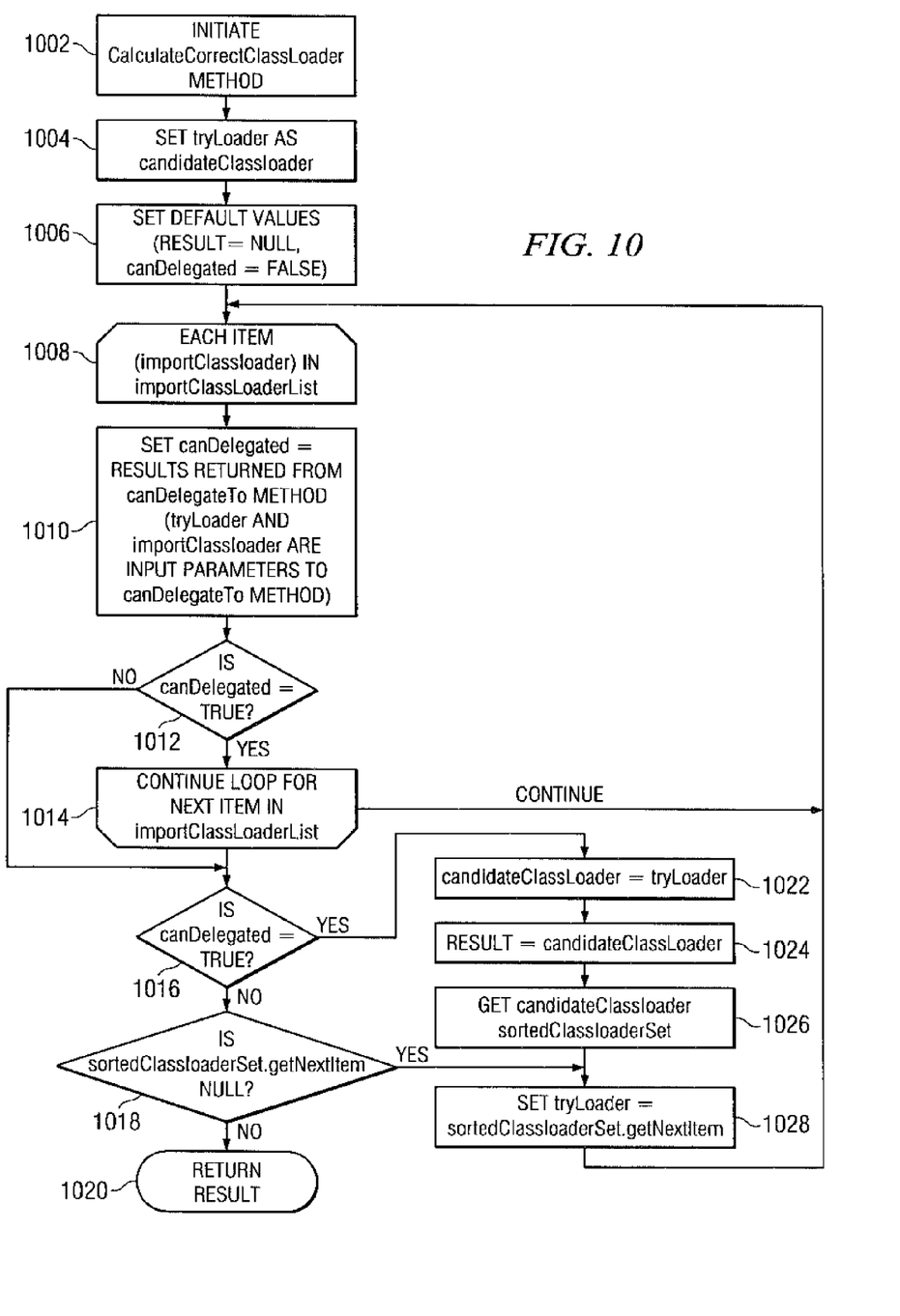
FIG. 10 is a flowchart of a process for calculating which classloader can load the BCI code in accordance with the illustrative embodiments.

FIG. 10 is a flowchart of a process for calculating which classloader from the candidate classloaders can load the BCI code in accordance with the illustrative embodiments. The process described in FIG. 10 is implemented as step 810 in FIG. 8.

The process begins with initiating the CalculateCorrectClassloader method using the importClassloaderList comprising the candidate classloaders determined in FIG. 9 (step 1002). The process then sets the tryLoader to be the candidate classloader (step 1004). The CalculateCorrectClassloader method then sets the default value of the result as NULL and the default value of the canDelegated method to FALSE for the tryLoader (step 1006).

Figure 11:
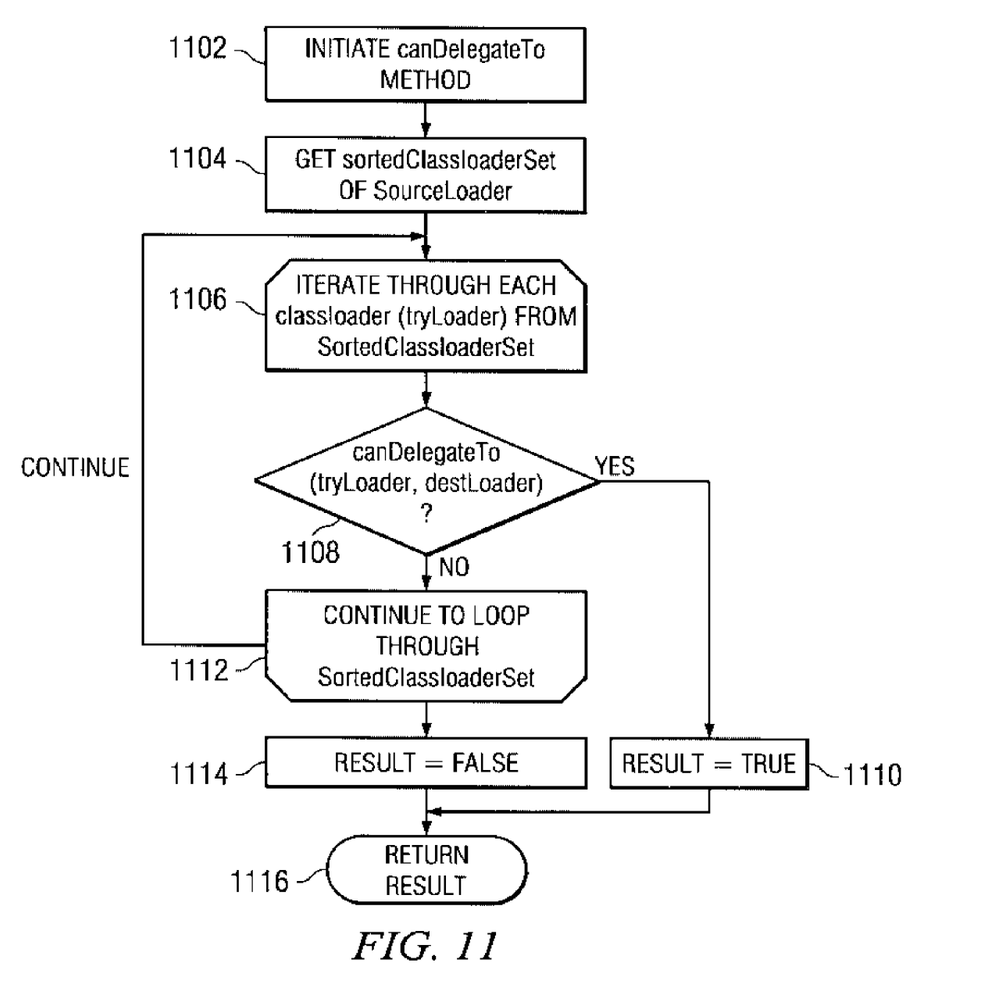
FIG. 11 is a flowchart of a process for determining whether a source classloader can delegate to a destination classloader in accordance with the illustrative embodiments.

For each item in the list of import classloaders (importClassLoaderList) for the needed BCI code (step 1008), the CalculateCorrectClassloader method sets canDelegated as the return value from the canDelegateTo method described in FIG. 11 (step 1010). Tryloader and importClassloader are input values for the canDelegateTo method. The CalculateCorrectClassloader method then determines if the canDelegated result value is TRUE (step 1012). This step, if true, enables the process to jump out of the iteration loop. If the canDelegated result value is TRUE ('yes' output of step 1012), the process loops (step 1014) back to step 1008 to process the next item in the importClassLoaderList.

If the canDelegated value is not TRUE ('no' output of step 1012), the CalculateCorrectClassLoader method determines if the canDelegated value is equal to TRUE (step 1016). If the canDelegated value is equal to TRUE, the process sets the candidate classloader as the tryLoader (step 1022). The CalculateCorrectClassloader method then generates a result with a value of the candidateClassLoader (step 1024). The CalculateCorrectClassloader method obtains the sortedClassloaderSet of the new candidate classloader (step 1026), since the candidate classloader is reset with the tryLoader in step 1022. The CalculateCorrectClassloader method then sets the tryLoader to the next item in the sortedClassloaderSet (step 1028). The process then loops back to step 1008.

Turning back to step 1016, if the canDelegated value is not equal to TRUE ('no' output of step 1016), the CalculateCorrectClassloader method determines if the next item obtained in the sortedClassloaderSet has value of NULL (step 1018). If the next item in the sortedClassloaderSet has a value of NULL ('yes' output of step 1018), the process continues to step 1028. If the next item in the sortedClassloaderSet does not have a value of NULL ('no' output of step 1016), the CalculateCorrectClassloader method has determined the correct classloader to load the new BCI code, and returns the correct classloader to the auto deployment code in step 810 in FIG. 8.

FIG. 11 is a flowchart of a process for determining whether a source classloader (sourceloader) can delegate to a destination classloader (destloader) in accordance with the illustrative embodiments. The process depicted in FIG. 11 is implemented as step 1010 of FIG. 10.

The process begins with initiating the canDelegateTo method using the source classloader and destination classloader (step 1102). The source classloader comprises the current tryLoader from step 1004 in FIG. 10. The destination classloader comprises the current importClassloader from the importClassloader list in step 1008 in FIG. 10. The canDelegateTo method obtains the sortedClassloaderSet of the sourceLoader (step 1104). The canDelegateTo method iterates through each classloader (tryLoader) in the sortedClassloaderSet of the source classloader (step 1106). The canDelegateTo method determines if the classloader can delegate to a particular destination loader based on input parameters comprising the tryLoader and the destination loader (step 1108).

If the classloader in the iteration cannot delegate to the destination loader ('no' output of step 1110), the process continues for the next iteration of the sortedClassloaderSet (step 1112) and loops back to step 1106. However, if there are no more classloaders in the sortedClassloaderSet, the canDelegateTo method generates a canDelegateTo result comprising a value of FALSE (step 1114). The canDelegateTo method then returns the result value (step 1116) to the CalculateCorrectClassloader method in step 1010 of FIG. 10.

If the classloader in the iteration can delegate to the destination loader ('yes' output of step 1108), the canDelegateTo method generates a canDelegateTo result comprising a value of TRUE (step 1110). The canDelegateTo method then returns the result value (step 1116) to the CalculateCorrectClassloader method in step 1010 of FIG. 10.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatic discovery of a classloader delegation hierarchy, the computer implemented method comprising:

instrumenting one or more classloaders with byte code instrumentation code such that a delegation event is received each time the one or more classloaders delegate a resource finding method to a parent classloader of the one or more classloaders;

determining, from each delegation event received, a classloader that generated the delegation event and a parent classloader to which the classloader directly delegates the resource finding method;

determining, based on the delegation events received, the classloaders to which a current classloader in the one or more classloaders can directly delegate; and determining an order of delegation to the classloaders.

2. The computer implemented method of claim 1, wherein the resource finding method is directed to a non-existent resource.

3. The computer implemented method of claim 1, wherein the resource finding method is instrumented with the byte code instrumentation code, and wherein determining, from each delegation event received, the classloader that generated the delegation event comprises determining a classloader instance name in each delegation event received.

4. The computer implemented method of claim 1, wherein the resource finding method is a getResource( ) method.

5. The computer implemented method of claim 4, wherein the resource finding method is user defined.

6. The computer implemented method of claim 5, wherein user defined resource finding methods under a control flow of the getResource( ) method are instrumented with the byte code instrumentation code.

7. The computer implemented method of claim 5, wherein user defined resource finding methods having a javax.net.URL java.lang.Classloader.*(*) signature are instrumented with the byte code instrumentation code.

8. The computer implemented method of claim 1, wherein the delegation event comprises a name of a classloader instance and a name of a non-existent resource.

9. The computer implemented method of claim 1, wherein the one or more classloaders instrumented with byte code instrumentation code comprise user customized classloaders.

10. The computer implemented method of claim 1, wherein the one or more classloaders are instrumented with byte code instrumentation code at runtime.

11. A data processing system for automatic discovery of a classloader delegation hierarchy, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to instrument one or more classloaders with byte code instrumentation code such that a delegation event is received each time the one or more classloaders delegate a resource finding method to a parent classloader of the one or more classloaders; determine, from each delegation event received, a classloader that generated the delegation event and a parent classloader to which the classloader directly delegates the resource finding method; determine, based on the delegation events received, the classloaders to which a current classloader in the one or more classloaders can directly delegate; and determine an order of delegation to the classloaders.

12. A computer program product for automatic discovery of a classloader delegation hierarchy, the computer program product comprising:

a tangible computer recordable storage medium having computer usable program code tangibly stored thereon, the computer usable program code comprising:

computer usable program code for instrumenting one or more classloaders with byte code instrumentation code such that a delegation event is received each time the one or more classloaders delegate a resource finding method to a parent classloader of the one or more classloaders;

computer usable program code for determining, from each delegation event received, a classloader that generated the delegation event and a parent classloader to which the classloader directly delegates the resource finding method;

computer usable program code for determining, based on the delegation events received, the classloaders to which a current classloader in the one or more classloaders can directly delegate; and computer usable program code for determining an order of delegation to the classloaders.

13. The computer program product of claim 12, wherein the resource finding method is directed to a non-existent resource.

14. The computer program product of claim 12, wherein the resource finding method is instrumented with the byte code instrumentation code, and wherein the computer usable program code for determining, from each delegation event received, the classloader that generated the delegation event comprises computer usable program code for determining a classloader instance name in each delegation event received.

15. The computer program product of claim 12, wherein the resource finding method is a getResource( ) method.

16. The computer program product of claim 15, wherein the resource finding method is user defined.

17. The computer program product of claim 16, wherein user defined resource finding methods under one of a control flow of the getResource( ) method or having a javax.net.URL java.lang.Classloader.*(*) signature are instrumented with the byte code instrumentation code.

18. The computer program product of claim 12, wherein the delegation event comprises a name of a classloader instance and a name of a non-existent resource.

19. The computer program product of claim 12, wherein the computer usable program code is stored in a computer readable storage medium in a data processing system, and wherein the computer usable program code is downloaded over a network from a remote data processing system.

20. The computer program product of claim 12, wherein the computer usable program code is stored in a computer readable storage medium in a server data processing system, and wherein the computer usable program code is downloaded over a network from a remote data processing system for use in a computer readable storage medium with the remote system.

* * * * *